Feb. 17, 1959 G. A. BRUNNER 2,873,930
BOBBIN HOLDER
Filed Feb. 29, 1956
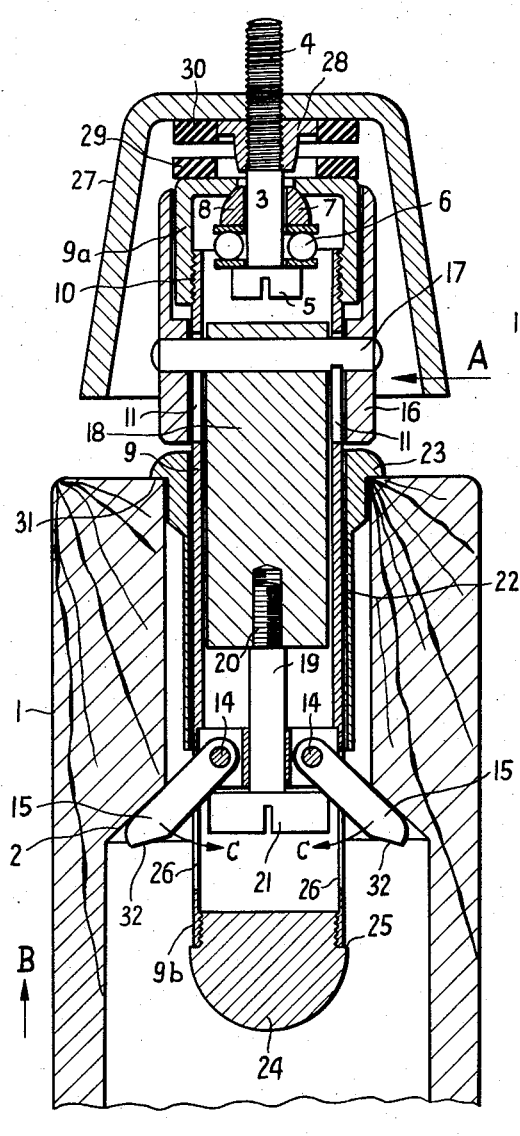
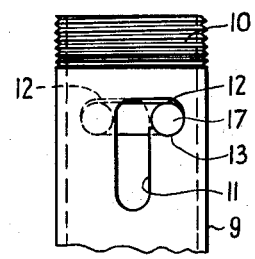
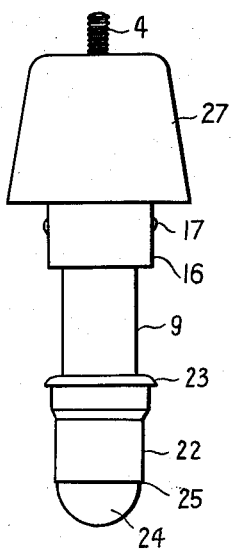
INVENTOR.
Gottfried August Brunner
BY Michael S. Striker
Attorney

2,873,930
BOBBIN HOLDER

Gottfried August Brunner, Munich, Germany

Application February 29, 1956, Serial No. 568,646

2 Claims. (Cl. 242—130.2)

This invention relates to certain means for the suspension of bobbins in the creels of textile spinning or speed frames or similar machines.

It is an object of the present invention to provide means of the type referred to which are very simple and operate without springs.

Another object of the invention is to provide a suspension arrangement of short length facilitating the creeling of the bobbins and permitting the construction of a creel with a correspondingly low total height.

Another object of the invention is to provide an arrangement for protecting the sensible bearing parts of the device against dust and fly.

Still another object of the invention is to provide a suspension and bearing arrangement permitting a safe fastening and quick removal of the bobbin in a simple and reliable manner and with a single manipulation.

Other and further objects, features and advantages of the invention will be pointed out hereinafter and appear in the appended claims forming part of the application.

In the accompanying drawings a now preferred embodiment of the invention is shown by way of illustration and not by way of limitation.

Fig. 1 is a side view of a suspension and bearing arrangement for hanging creel bobbins having the invention applied thereto, Fig. 2 is a longitudinal section thereof, with a bobbin creeled thereon, on a larger scale, and Fig. 3 is a side view on the bearing sleeve thereof, in the direction A of Fig. 2.

Similar reference numerals denote similar parts in the different views.

In the drawing the creel bobbin 1 is formed with an interior conical shoulder 2 adapted for fixing the bobbin on a downwardly projecting bearing sleeve 9. The bearing arrangement includes a bearing bolt or screw 3 adapted to be screw-fastened in the creel (not shown) by means of a threaded portion 4. A ball or roller bearing 6 is supported on the upper face of the head 5 of this bolt, while a ring 7 having a spherical outer surface is seated on the ball-bearing. A cap 9a screwed to a bearing sleeve 9 at 10 bears on the spherical surface 8 of ring 7. The bearing sleeve 9 thus is mounted for rotation about the axis of the bearing bolt 4 but free to swing in any direction about said spherical surface 8. In its upper part the bearing sleeve 9 is formed with two diametrically opposed vertical slots 11 each passing over into an upper horizontal extension 12 of the slot, Fig. 3. Each of said horizontal slots 12 has a notch or groove 13. Swingably mounted on the lower part of the bearing sleeve 9, at 14, are two supporting levers 15. Moreover, a bayonet ring 16 is loosely mounted on the bearing sleeve 9, and fitted with a cross pin 17 projecting through said slots 11 so that it is able to slide in these slots 11 and in the slots 12 for engagement in one of the grooves 13. Moreover, a piston 18 slidably mounted in the bearing sleeve 9 is supported on the cross pin 17 and carries a downwardly projecting bolt 19 which is secured in the piston by means of a thread 20 and formed with a head 21 which according to Fig. 2 is able to spread the two supporting levers 15 into their outward position as the bayonet ring 16 is moved upwardly.

Moreover, a protective ring 22 is provided on the bearing sleeve 9 so as to be axially slidable and rotatable, and formed with a flange 23 for engagement of the bobbin 1. Said ring 22 will slide downwardly as the bobbin is doffed, to such an extent that it covers the two supporting levers 15. Since the creeling of the bobbins on the said bearing arrangement in most instances takes place in an inclined position, the protective ring 22 prevents the supporting levers 15 from swinging outwards on their pivot pins 14 and thus rendering the creeling of the bobbin 1 difficult or even impossible.

In the preferred embodiment as shown, the lower end 9b of the bearing sleeve is closed by a threaded stopper or plug 24 formed at 25 with a projecting shoulder and serving as a stop or abutment for the protective ring 22 as indicated in Fig. 1. Moreover, two vertical slots 26 for passage of the supporting levers 15 are provided in the bearing sleeve 9.

In order to protect the ball-bearing 6 against dust and fly, a protective cap 27 is secured to the bearing bolt 3 which cap may be screwed on the thread 4 together with a member 28.

Moreover, a coupling device is provided between the cap 9a of the bearing sleeve and the bearing bolt 3 or the protective cap 27 connected therewith, respectively, for preventing rotation of the bearing sleeve as it is raised. This coupling may consist of pins, toothed discs or the like. In the embodiment shown in Fig. 2, two friction rings 29 and 30 are provided to this end, ring 29 being secured on the cap 9a while the ring 30 is secured to the protective cap 27.

The operation of the bearing arrangement hereinbefore described is as follows:

When creeling the bobbin 1 in the direction B, the inner edge 31 of the bobbin will engage the flange 23 of the protective ring 22 so that the latter is also moved upwards and clears the slots 26. On further upward movement the flange 23 of the protective ring 22 will engage the bayonet ring 16, whereat the cross pin 17 slides upwards in the longitudinal slots 11 up to the upper end thereof, so that the bearing sleeve 9 is now also raised and forced with its coupling ring 29 against the stationary coupling ring 30. Simultaneously, when raising the bayonet ring 16, the piston 18 and with it the bolt 19 is taken along in an upward direction so that the head 21 of the bolt strikes against the inclined surface 32 of the levers 15 and thereby moves these levers outwards into the spread position shown in Fig. 2. Then the upwardly urged bobbin is turned through a certain angle whereby through frictional engagement between the parts 1, 23 and 16 the bayonet ring 16 is taken along, i. e. rotated, so that the cross pin 17 slides into the horizontal slots 12. During this movement the bearing sleeve 9 is secured against rotation by the coupling 29, 30. When the bobbin 1 is finally let go, the transverse pin 17 will engage in the depressions 13 so that the bayonet ring 16 is locked. The piston 18 therefore cannot slide downwards any more, so that the head of the threaded bolt 21 will hold the supporting levers 15 in their spread position as shown; hence the bobbin 1 is supported on these levers 15 by means of its conical shoulder 2.

In order to doff the bobbin, the same is slightly lifted so that the transverse pin 17 comes out of the recesses 13, then rotated through a small angle to permit the cross pin 17 to pass into the vertical slots 11. The bayonet ring 16 is now free to slide downwards with the piston 18, whereby the supporting levers 15 are allowed to swing inwardly in the direction C. The bobbin 1 is thus released and can be doffed.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A bearing arrangement for the suspension of bobbins in the creels of textile and similar machines, comprising a stationary vertical bearing peg, a bearing on the peg, a tubular member suspended from this bearing and being rotatable about the peg and swingable in all directions, a cap member forming the upper end of the tubular member, a coupling member secured on the cap, and a second coupling member which is fixedly connected to the bearing peg and adapted to cooperate with the first coupling member in the upper end position of the tubular member for protecting the tubular member against rotation, a plurality of supporting levers whose upper ends are pivoted on the lower part of the tubular member, a bayonet ring slidably and rotatably mounted on the tubular member and adapted to be raised by the bobbin as it is creeled, bayonet catch means including a cross pin adapted to lock the bayonet ring to the tubular member after lifting and turning of the bayonet ring, and a piston which is slidable in the tubular member and mounted on the cross pin, said piston having a downwardly projecting bolt with a head adapted to spread the two supporting levers when moving upwardly.

2. An arrangement for the suspension of bobbins and the like in textile and similar machines comprising, in combination, a stationary bearing and supporting means; a downwardly extending tubular rotary supporting member rotatably supported by said bearing and supporting means and adapted to receive a bobbin, said rotary supporting member being movable in its axial direction with respect to its bearing means between its regular operating position and a raised position; arresting means interposed between said rotary supporting member and said stationary supporting means, said arresting means being inoperative when said rotary supporting member is in its operating position, but preventing rotation of said rotary supporting member when the latter is moved into said raised position; holding means including at least two supporting levers pivotally mounted on said supporting member for movement between an operative position in which said supporting levers are projecting outwardly from said tubular supporting member to hold a bobbin on said supporting member and an inoperative position in which said supporting levers are located substantially within said tubular supporting member so that a bobbin is released therefrom; operating means including a sleeve member mounted slidably and turnably on said tubular supporting member and connected with an actuating member mounted slidably and turnably inside said tubular supporting member for actuating said supporting levers, said sleeve and actuating member being movable between a non-actuating position in which said actuating member permits said supporting levers to move from their operative into their non-operative position, and an actuating position in which said actuating member maintains said supporting levers in their operative position; and means for retaining said operating means in its actuating position whenever desired, said retaining means including a cross-pin connecting said sleeve member and said actuating member, and guide slots in said tubular supporting member for accommodating said cross-pin, a portion of said slots extending in axial direction for permitting said cross pin a sliding movement in axial direction of said tubular supporting member along said portion of said slots, and another portion of said slots extending in circumferential direction for permitting said cross-pin, when said operating means are in their actuating position, a turning movement along said other portion of said slots, so that said operating means are held in actuating position and against movement in axial direction when said sleeve member is turned about said tubular supporting member and said cross-pin is thereby moved into said other portion of said guide slots.

References Cited in the file of this patent

UNITED STATES PATENTS

| 2,047,714 | Smith | July 14, 1936 |
| 2,103,586 | Kitchel et al. | Dec. 28, 1937 |

FOREIGN PATENTS

| 575,743 | Great Britain | Mar. 4, 1946 |
| 685,790 | Great Britain | Jan. 14, 1953 |